(12) United States Patent
Shieh et al.

(10) Patent No.: US 11,902,356 B1
(45) Date of Patent: Feb. 13, 2024

(54) COMPUTER TECHNOLOGY FOR DEVICE FORWARDING DOWNLOADS

(71) Applicant: INTERNATIONAL BUSINESS MACHINES CORPORATION, Armonk, NY (US)

(72) Inventors: Johnny Shieh, Austin, TX (US); Kelley Anders, East New Market, MD (US); Jessica Murillo, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/069,300

(22) Filed: Dec. 21, 2022

(51) Int. Cl.
*H04L 67/06* (2022.01)
(52) U.S. Cl.
CPC .................... *H04L 67/06* (2013.01)
(58) Field of Classification Search
CPC ........................................................ H04L 67/06
See application file for complete search history.

(56) References Cited

U.S. PATENT DOCUMENTS

| | | | |
|---|---|---|---|
| 10,169,548 B2 | 1/2019 | Anders | |
| 10,462,231 B2 | 10/2019 | Allinson | |
| 10,776,103 B2 | 9/2020 | Gordon | |
| 10,884,885 B2 | 1/2021 | Anders | |
| 10,924,144 B2 | 2/2021 | Zalewski | |
| 2007/0162611 A1* | 7/2007 | Yu | H04N 21/4325 348/E5.002 |
| 2010/0257051 A1* | 10/2010 | Fernandez | G06Q 30/02 705/14.43 |
| 2010/0333116 A1* | 12/2010 | Prahlad | G06F 3/0649 713/153 |
| 2015/0023404 A1* | 1/2015 | Li | H04L 65/612 375/240.02 |
| 2015/0072662 A1 | 3/2015 | Chandrasekaran | |

OTHER PUBLICATIONS

"How to Resume an Interrupted Download—part 2", Stack Overflow, Downloaded from the Internet on Oct. 12, 2022, 12pgs., <https://stackoverflow.com/questions/3428102/how-to-resume-an-interrupted-download-part-2>.
"Is There a Way to Resume an Interrupted SCP of a File?", Stack Exchange, Superuser, Downloaded from the Internet on Oct. 12, 2022, 4 pgs., <https://superuser.com/questions/421672/is-there-a-way-to-resume-an-interrupted-scp-of-a-file>.

(Continued)

*Primary Examiner* — Benjamin M Thieu
(74) *Attorney, Agent, or Firm* — David B. Woycechowsky (57) ABSTRACT

Computer technology for performing a download of a set of file(s) by multiple computer devices. Different computer devices respectively download different parts of the set of files and respectively encapsulate them with file wrappers to create multiple "sealed off portions." Each sealed off portion indicates what portion of the code of the set of file(s) is in that sealed off portion. The multiple sealed off portions are transferred (for example, over a local area network) to another computer device, which may, or may not, be one of the multiple computers that created one of the sealed off portions, and this computer device assembles the sealed off portions to re-create the set of file(s).

1 Claim, 5 Drawing Sheets

(56) References Cited

OTHER PUBLICATIONS

"Resumable File Downloading/Uploading in Android", Stack Overflow, Downloaded from the Internet on Oct. 12, 2022, 2 pgs., <https://stackoverflow.com/questions/17167515/resumable-file-downloading-uploading-in-android>.

"What is the Dish Tv Hopper?", Kinetic by Windstream, Downloaded from the Internet on Oct. 12, 2022, 2 pgs., <https://www.windstream.com/support/tv-entertainment/dish/what-is-the-dish-tv-hopper>.

Disclosed Anonymously, "Dynamic Application Session Evaluation", An IP.com Prior Art Database Technical Disclosure, IP.com No. IPCOM000262270D, IP.com Electronic Publication Date: May 15, 2020, 4 pgs.

Disclosed Anonymously, "Method for Identifying IoT Devices to Enable Seamless Transfer of Chat Sessions", An IP.com Prior Art Database Technical Disclosure, IP.com No. IPCOM000263406D, IP.com Electronic Publication Date: Aug. 27, 2020, 5 pgs.

Disclosed Anonymously, "System And Method Of Visually Constructing A Progressively Downloadable Application", An IP.com Prior Art Database Technical Disclosure, IP.com No. IPCOM000256406D, IP.com Electronic Publication Date: Nov. 28, 2018, 6 pgs.

Disclosed Anonymously, "Transfer and Restore Anonymous User's Event Chain in the Web Application Between Different Smart Devices", An IP.com Prior Art Database Technical Disclosure, IP.com No. IPCOM000236709D, IP.com Electronic Publication Date: May 12, 2014, 13 pgs.

\* cited by examiner

FIRST SEALED OFF PORTION 258

METADATA 265
USER: BETTY
DOWNLOAD ID: 13254
FILE TYPE: VIDEO
BITS PER CODE LINE: 1024
TOTAL CODE LINES: 1000
DOWNLOADED PORTION: LINES 1-100 AND 500-1000

AUDIO/VIDEO CONTENT 266

| LINES 1-100 | LINES 500-1000 |

COMPUTER TECHNOLOGY FOR DEVICE FORWARDING DOWNLOADS

BACKGROUND

The present invention relates generally to the field of downloading data (for example, a file, a set of files) from a set of server computer(s) to one or more user device(s), such as desktop computers, laptop computers and/or smartphones.

The Wikipedia entry for "download" (as of 4 Nov. 2022) states, in part, as follows: "In computer networks, download means to receive data from a remote system, typically a server such as a web server, an FTP server, an email server, or other similar system. This contrasts with uploading, where data is sent to a remote server. A download is a file offered for downloading or that has been downloaded, or the process of receiving such a file . . . . Download data is sent downstream to an end-user, upstream from the provider . . . . Downloading generally transfers entire files for local storage and later use, as contrasted with streaming, where the data is used nearly immediately, while the transmission is still in progress, and which may not be stored long-term . . . . Downloading is not the same as data transfer; moving or copying data between two storage devices would be data transfer, but receiving data from the Internet or BBS is downloading." (footnotes omitted)

It is understood in the art that downloads typically result in data, such as a computer file, being transferred to a single machine. For example, consider a user who has a desktop computer and a laptop computer. If the user wants to download a word processing application to both of their machines, then the user would typically download the file to the desktop and, as a completely separate download operation, also download the word processing application to their laptop.

The Wikipedia entry for "archive file" (as of 5 Dec. 2022) states, in part, as follows: "In computing, an archive file is a computer file that is composed of one or more files along with metadata. Archive files are used to collect multiple data files together into a single file for easier portability and storage, or simply to compress files to use less storage space. Archive files often store directory structures, error detection and correction information, arbitrary comments, and sometimes use built-in encryption . . . . Archive files are particularly useful in that they store file system data and metadata within the contents of a particular file, and thus can be stored on systems or sent over channels that do not support the file system in question, only file contents—examples include sending a directory structure over email, files with names unsupported on the target file system due to length or characters, and retaining files' date and time information. Additionally, it facilitates transferring high numbers of small files such as resources of saved web pages, since a container file is transferred using a single file operation, whereas transferring many small files requires the computer to modify the file system structure for each file individually, making it considerably slower. Software distribution[.] Beyond archival purposes, archive files are frequently used for packaging software for distribution, as software contents are often naturally spread across several files; the archive is then known as a package. While the archival file format is the same, there are additional conventions about contents, such as requiring a manifest file, and the resulting format is known as a package format. Examples include deb for Debian, JAR for Java, APK for Android, and self-extracting Windows Installer executables. Features[.] Features supported by various kinds of archives include:

converting metadata into data stored inside a file (e.g., file name, permissions, etc.)
checksums to detect errors
data compression
file concatenation to store multiple files in a single file
file patches/updates (when recording changes since a previous archive)
encryption
error correction code to fix errors
splitting a large file into many equal sized files for storage or transmission Some archive programs have self-extraction, self-installation, source volume and medium information, and package notes/description. The file extension or file header of the archive file are indicators of the file format used. Computer archive files are created by file archiver software, optical disc authoring software, and disk image software. Archive formats[.]

An archive format is the file format of an archive file. Some formats are well-defined by their authors and have become conventions supported by multiple vendors and communities . . . . Filename extensions used to distinguish different types of archives include zip, rar, 7z, and tar, the first of which is the most widely implemented. Java also introduced a whole family of archive extensions such as jar and war (j is for Java and w is for web). They are used to exchange entire byte-code deployment. Sometimes they are also used to exchange source code and other text, HTML and XML files. By default they are all compressed." (footnotes omitted)

In this document, the "archive files" and associated protocols will generally be referred to as "file wrappers." It is noted that file wrappers typically only store a complete file and/or multiple complete files—they do not typically store parts of files (herein referred to as "file portions").

SUMMARY

According to an aspect of the present invention, there is a method, computer program product and/or system for use with a plurality of downloading devices in data communication with others that performs the following operations (not necessarily in the following order): (i) for each given downloading device of the plurality of downloading devices, downloading a different portion of a downloadable file to the given downloading device; (ii) for each given downloading device of the plurality of downloading devices, creating a sealed off packet that includes: (a) payload data in the form of the portion of the downloadable file downloaded to the given downloading device, and (b) metadata that includes a download identification code and an indication of what portion of the downloadable file is included in the payload data; (iii) collecting, by a reconstructing device, sealed off packets from the plurality of downloading devices; and (iv) reconstructing, by the reconstructing device, the downloadable file from the data in the payloads of the sealed off packets based on the metadata of the sealed off packets.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1A:
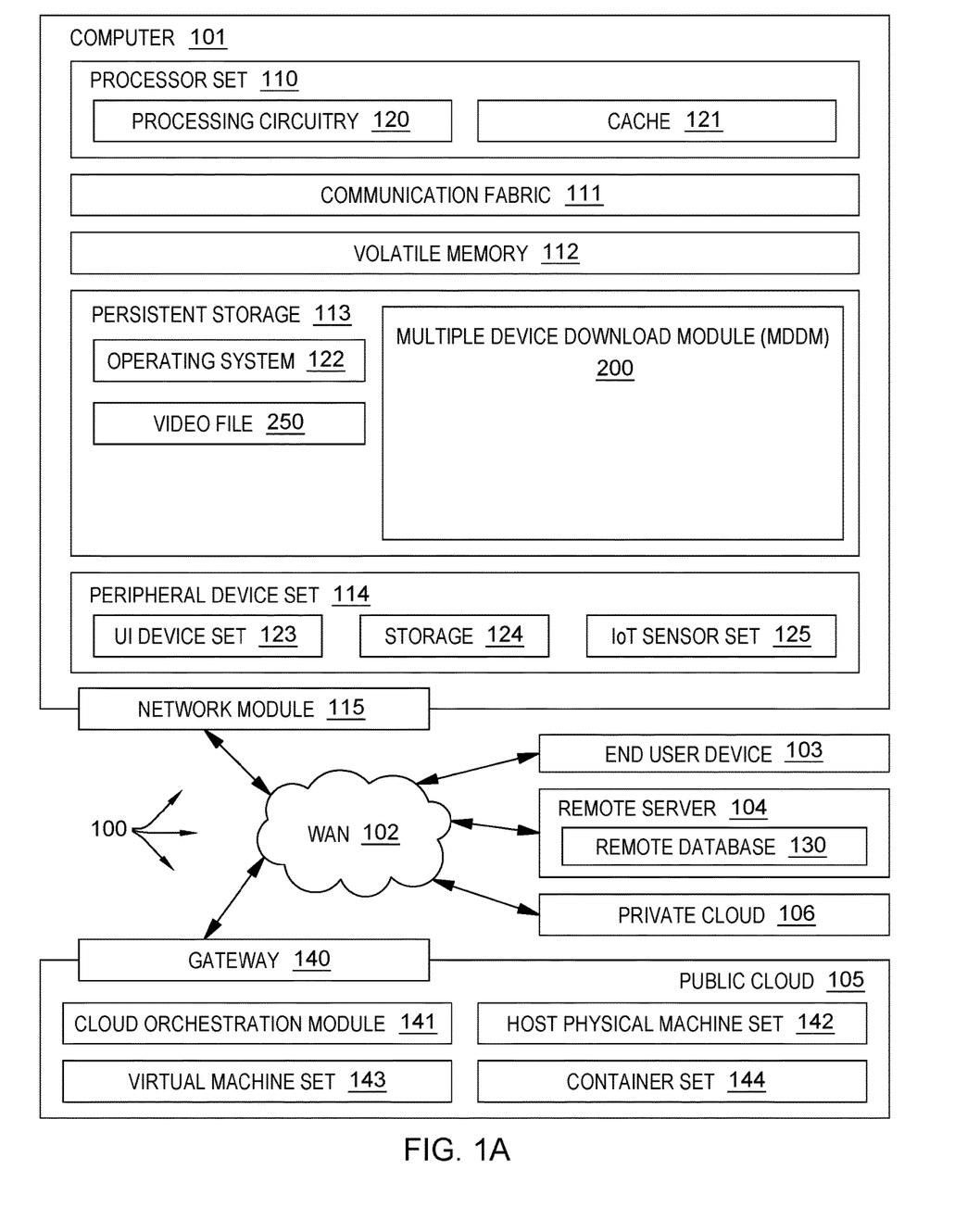
FIGS. 1A and 1B, taken together, form a block diagram of a first embodiment of a system according to the present invention.
Figure 1B:
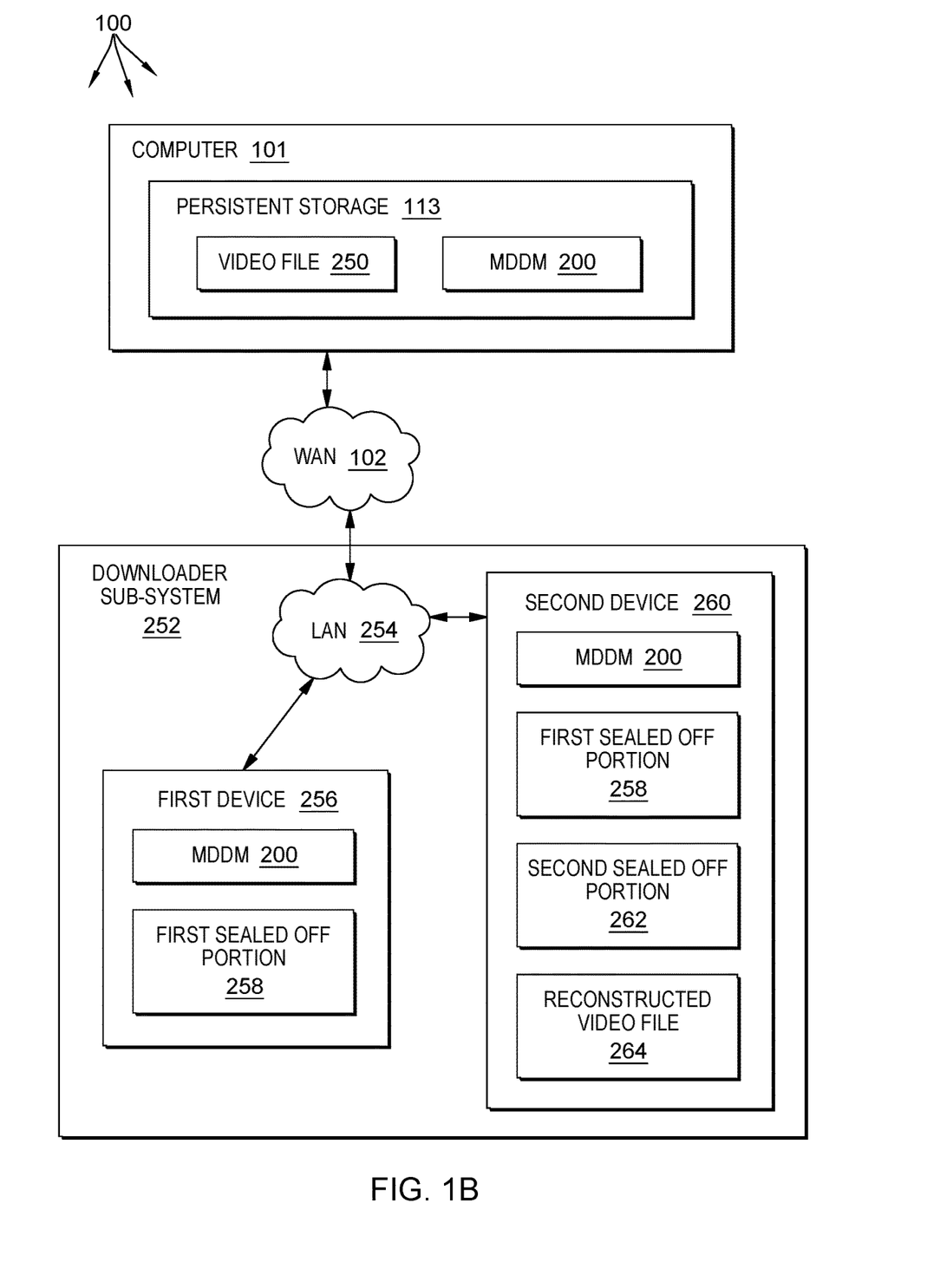

As shown in FIGS. 1A and 1B, computing environment 100 contains an example of an environment for the execution of at least some of the computer code involved in performing the inventive methods, such as multiple device download module 200 (also herein sometimes referred to as block 200 or MDDM 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 video file 250 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, container set 144, and downloader sub-system 252 (including local area network (LAN) 254, first device 256 and second device 260). It is noted that MDDM 200 is downloaded from computer 101 to the first and second devices in order to facilitate the multiple device downloading of the present invention, which will be discussed in detail, below.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. These asynchronous network communication "packets" should not be confused with the partially encapsulated download type "packets" which are extensively discussed below. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

II. Example Embodiment

Figure 2:
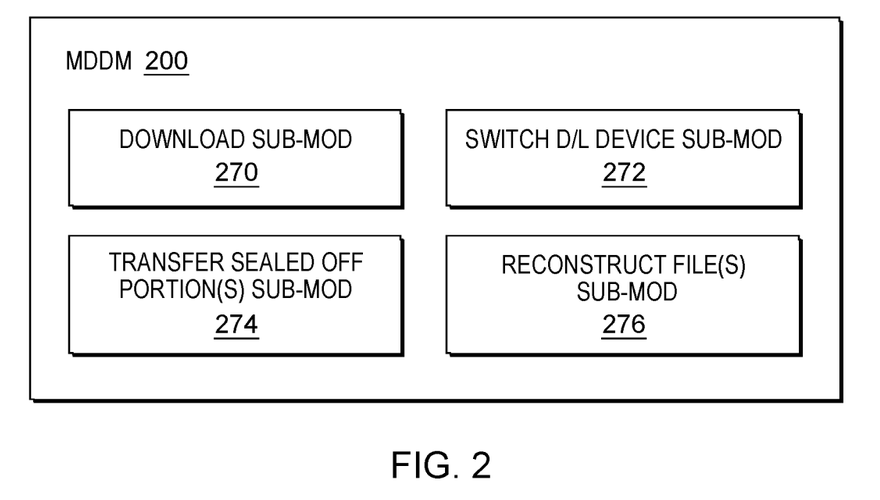
FIG. 2 is a block diagram showing a machine logic (for example, software) portion of the first embodiment system.
Figure 3:
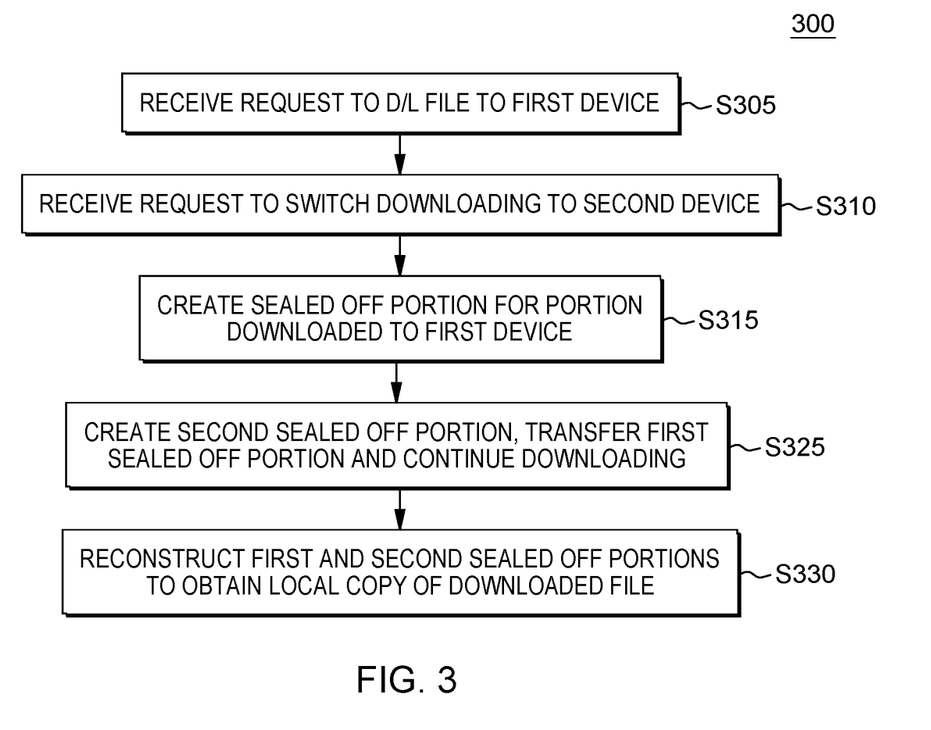
FIG. 3 is a flowchart showing a first embodiment method performed, at least in part, by the first embodiment system.

Computing environment 100 is an environment in which an example method according to the present invention can be performed. As shown in FIG. 3, flowchart 300 shows an example method according to the present invention. As shown in FIG. 2, block 200 performs or controls performance of at least some of the method operations of flowchart 300. This method and associated software will now be discussed, over the course of the following paragraphs, with extensive reference to the blocks of the first three figures.

Before describing the method of flow chart 300, so notes on the computer architecture will now be noted. In this example, the set of devices that will co-operatively perform the download are first device 256 (an end user's home computer in this example) and second device 260 (the end user's smart phone). Devices 2567, 260 communicate with the internet (for example, through WAN 102) through local area network 254 (that is, a Wi-Fi modem router located in the end user's home in this example). In some embodiments more than two devices will be involved in the download (see example of FIG. 5, discussed below). Also, while this example, relies on devices that communicate through a Wi-Fi 33 based LAN, not all embodiments require the set of downloading devices to share a common LAN, or for a LAN intermediary to be present at all. Finally, before discussing the method of flowchart 300, it is noted that MDDM 200 is first downloaded to each device 256, 260 to be involved in the download—in this embodiment MDM 200 is in the form of a downloadable app that can be used by personal computers (like device 256) and smart phones (like device 260).

Processing begins at operation S305, where computer 101 module ("mod") 302 receives a request to download video file 250 (see FIG. 1B) to first device 256 through WAN 102 and LAN 254. The user of downloader sub-system 252 has requested the video file from computer 101 using download sub-mod 270 of the copy of MDDM 200 located locally internally in device 256. More specifically, in this example, the user is named Betty, the download has been assigned identification number 13254 and the code of video file 250 has 1000 code lines, with each line having 1024 bits (see diagram 400 of first sealed off portion 258 in FIG. 4). These 1000 lines of code of the video file begin to download as audio/video content 266 (see FIG. 4). In this example, a single file is being downloaded (video file 250), but some embodiments may allow a batch of files, or a set of files included in a single file wrapper (for example, a ZIP file with multiple constituent files in the ZIP file).

In some embodiments, the pieces of data (for example, parameter values, attribute values, other data) that must be included in a sealed off wrapper are as follows: mapping to original package name, download location, size, format, device name(s) and locations, unique identifier, Provider/Source of download, order of wrapper, and other meta-data that would help describe the package and its contents.

Processing proceeds to operation S310, where switch download device sub-mod 272 of the copy of MDDM 200 located in device 256 sends a request to computer 101 and second device 260 to have the downloading of video file continued on second device 260 rather than first device 256. In this example, the reason for the download device switch is that first device 256 requires an immediate update to its operating system.

Figure 4:
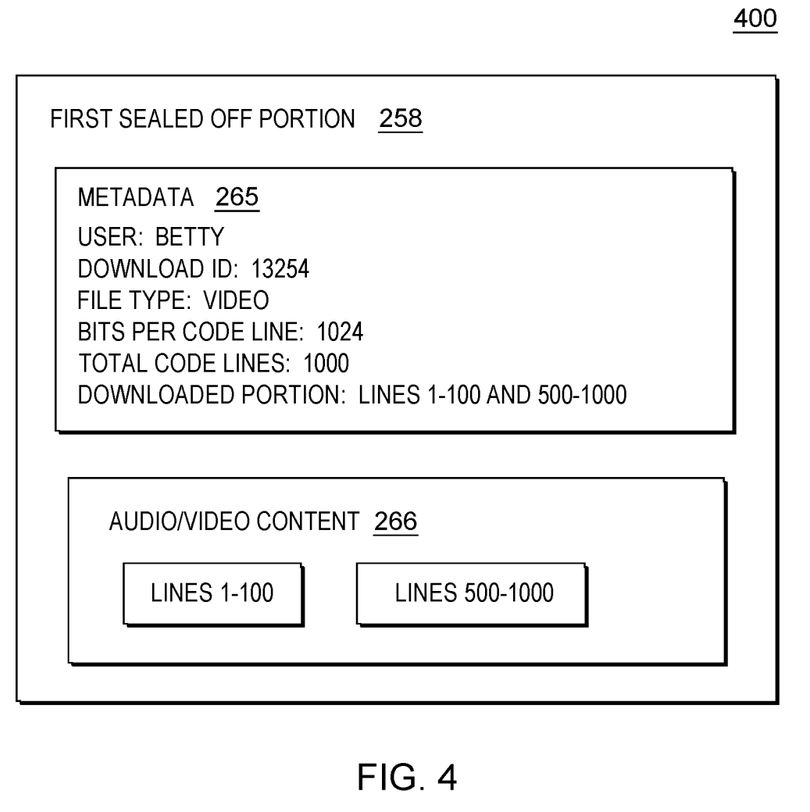
FIG. 4 is a block diagram showing a sealed off portion of a file downloaded by the first embodiment system.

Processing proceeds to operation S315, where sub-mod 272 creates a sealed off packet for the portion of video file 250 that has already been downloaded before the switch in downloading device was requested. More specifically, FIG. 4 shows first sealed off portion 258 including metadata 265 and audio/video content 266. It is noted that metadata 265 is metadata for sealed off packet 258—any metadata included within video file 250 itself would be included in audio/video content 266. The first sealed off portion is like a file packet, with an important difference being that only a portion of a payload file (or files) is in the sealed off packet and not a complete file (or set of files). It is noted that metadata 265 includes the data about file structure (for example, 1024 bits per line, total code lines 1000) and download progress (for example, likes 1-110 and 500-1000 have already been downloaded). The file structure and download progress can be tracked and communicated in different ways, using different attributes. For example, the downloadable file may not use the construct of code lines with a fixed number of bits per line. As an alternative way of tracking download progress, for example, would be to give a precise proportion of the file that has been downloaded, starting from the start of the file. The metadata of the sealed off package will include at least: (i) identification of a download instance (see FIG. 4 at download ID field); and (ii) an indication of the portion of the download that is included in the sealed off packet (see FIG. 4 at downloaded portion field). In this example, only one (1) sealed off packet is transferred from the first device to the second device. Alternatively, first device 256 might have previous sealed off packets from devices that previously participated in the download—these additional sealed off packets would either be combined into the first sealed off packet or maintained and sent to second device 260 separately from the first sealed off packet.

A note on terminology: the present document uses the term "packet" to denote partial files that are encapsulated and contain data from partial download(s) of proper file(s). This usage of the term "packet" should not be confused with "packets" that are used to divide and asynchronously transfer computer data, such as TC/IP protocol "packets" (which do not contain partial downloads). The "packets" of the present invention may also be called "packages" or "encapsulated partial downloads."

Processing proceeds to operation S325, where transfer of sealed off portion(s) sub-mod 274 of MDDM 200 first device 256 sends first sealed off portion 258 to second device 260 through LAN 254. At operation S325, transfer of sealed off portions sub-mod 274 of MDDM 200 of second device 260 determines what file portions still need to be downloaded from computer 101 and begins downloading the remainder of video file 250 into second sealed off portion 262. Alternatively, the continuing download may be routed to first sealed off packet 258 instead of creating a new sealed off packet for the new downloading device.

Processing proceeds to operation S330, where, after the remainder of video file 250 has been downloaded from computer 101 to second device 260, reconstruct file(s) sub-mod 276 uses the first and second sealed off packets to reconstruct a local copy of video file 250, which is reconstructed video file 264 stored in second device 260. More specifically, code lines 1-100 and 500-1000 come from the first sealed off packet and lines 101-499 come from the second sealed off packet. Now that the entire video file has been downloaded as reconstructed video file 264, the video can be watched on second device 260, or transferred back to first device 256 after the operating system update has completed.

III. Further Comments and/or Embodiments

While working on your home computer, a user realizes that they need to go into the office. However, the user just happens to be downloading something on their computer that will not be finished before the user needs to leave. Some embodiments of the present invention recognize that there is a need for a solution for this scenario when a user is performing a long-running download, such as a download of a SCP (system control program).

A method according to an embodiment of the present invention includes the following operations (not necessarily in the following order): (i) continuing an application session from a first device to an intermediary device and to a final device; (ii) initiating the application session on the first device, wherein the application sessions involves downloading one or more files; (iii) retrieving application session data from the first device, wherein the application session data comprises of package name, location, size, identification of the first device and format; (iv) requesting to a user whether to continue the application session onto the intermediary device or close the application session; (v) receiving a positive response from the user to continue the application session onto the intermediary device, sealing off the application session; (vi) saving relevant information related to the application session; (vii) continuing the application session on the intermediary device; (viii) determining from the user whether the intermediary device is a final device; (ix) in response from the user stating that the intermediary device is not the final device, saving the relevant information of the application the session from the intermediary device for the final device; and (x) continuing the application session on the final device.

In dome embodiments, the first device is a home computer, the intermediary device is a mobile phone and the final device is a work computer. In some embodiments, application session data and other relevant information in a database for future learning and usage.

Some embodiments of the present invention may include one, or more, of the following operations, features, characteristics and/or advantages: (i) enables the partially completed copy to be preserved or "sealed off"; (ii) enables the partially completed copy to be shifted over from the originating machine (for example, at home) to another intermediary device (for example, a cell phone) while driving; (iii) enables the partially completed copy to be shifted to a final device (for example, a machine in an office/work environment); (iv) allows the copy to start from the sealed off point; and/or (v) the SCP or download finishes on the office/work machine and the sealed off portions are ultimately stitched together.

Some embodiments of the present invention may include one, or more, of the following operations, features, characteristics and/or advantages: (i) triggered once a download is started; (ii) captures related data such as, but not limited to, the package name, location, size, format, and most common devices engaged with by the user (that is, could be accomplished with logs, database calls, and/or metadata associated with the package); (iii) the user either pauses or begins to shut down other applications and the system asks if they want to transfer to another device, if yes, the system produces a list of forwarding devices; (iv) the system seals off the first portion and saves the file along with unique identifiers and stopping place that allows for restitching the complete file back together; (v) the system repeats item (vi) above if/when moving from an intermediary device to the final device; (vii) takes data captured from each operation and stitches the download back together, finalizing it on the final machine; and/or (viii) once the transaction is complete, the results are stored in the system for future learning and use.

Some embodiments of the present invention may include one, or more, of the following operations, features, characteristics and/or advantages: (i) does not include predicting download movement failure; (ii) includes moving the download from one device to another based on the users' needs, location and/or schedule; (iii) preserves the package so that it can be stitched together on the final device; (iv) does not include looking to move replay from one device to another in a localized network; and/or (v) moves the download from one device to another based on the user needs, location and/or schedule, so the download can be stitched together on the final device.

Some embodiments of the present invention may include one, or more, of the following operations, features, characteristics and/or advantages: on one device and then patched back together on the final device or moved in parallel onto the next device in the chain; (i) the various devices, which each download a portion focuses on sealing off downloading file(s) preemptively so that either the part that is already downloaded can be saved e file do not need to call each other to co-ordinate the download; (ii) knows the trajectory or path of the devices from the starting device to the finishing device (it is noted that the trajectory of path is the sequence of devices used to download the various portions of the downloaded file; (iii) seals off the first portion and saves the file along with unique identifiers and stopping place, which allows for restitching the complete file back together; (iv) sealing off includes capturing metadata, such as but not limited to: (a) the IP (internet protocol) addresses of download origination and target, (b) the portion of the file that has been downloaded, timestamped or the start and timestamp of sealing, and/or (c) the total size of the file (that is, for comparison/unique identifier); (v) has the ability to create a JSON (JavaScript object notation) wrapper that would be able to be called via Python, Java or Perl script from a shell; and/or (vi) the system repeats the above operations if/when moving from an intermediary device to a final device.

Some embodiments of the present invention may include one, or more, of the following operations, features, characteristics and/or advantages: (i) takes data captured from each operation and stitches the download back together, finalizing it on the final machine; (ii) calls each sealed off portion and stitches them back together using the captured and created metadata; and/or (iii) has the ability to use a file splitter to pre-process the original file for download such as GSplit or WinZip as a wrapper (in this context, "wrapper" means the sealed off portion of the downloadable package/file(s)/portions).

Figure 5:
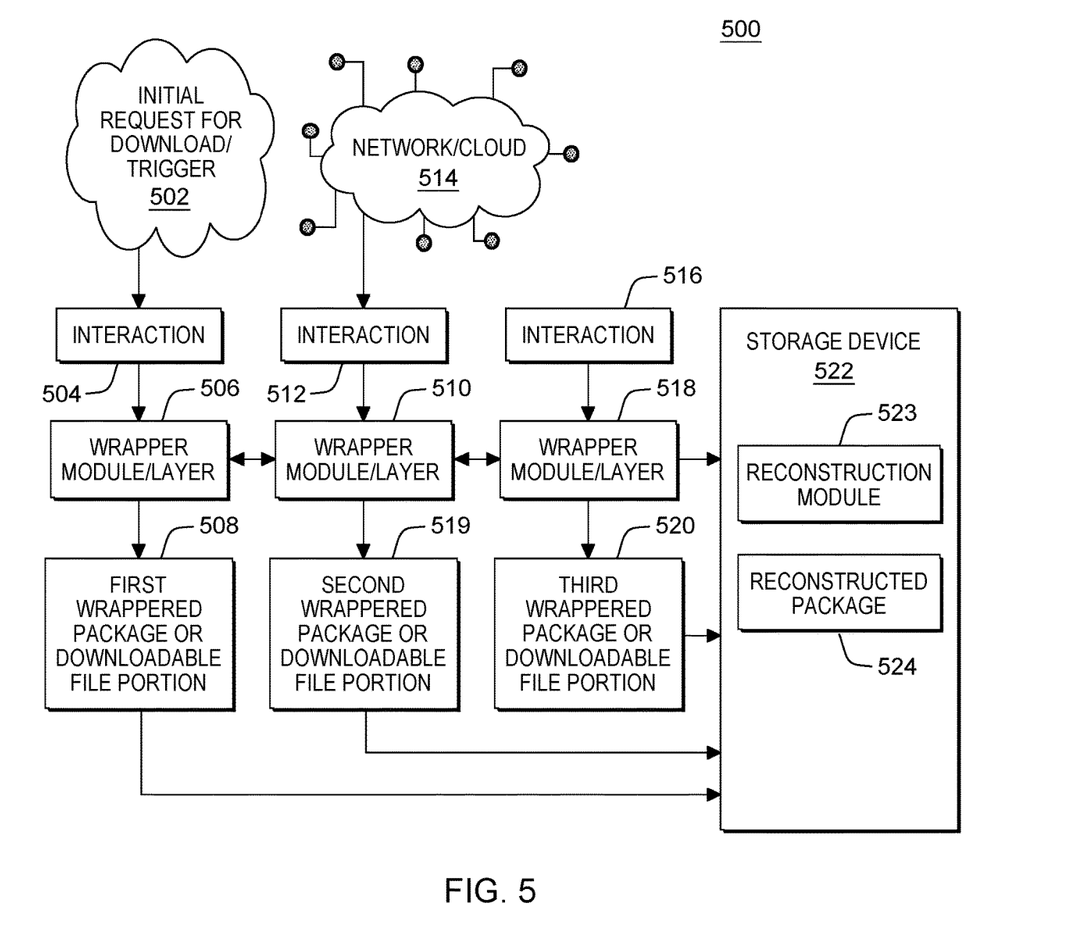
FIG. 5 is a block diagram helpful in understanding various embodiments of the present invention.

As shown in FIG. 5, diagram 500 includes: initial request for download/trigger block 502; interaction block 504; wrapper module/layer block 506; first wrapped package or downloadable file portion block 508; wrapper module/layer block 510; interaction block 512; network/cloud block 514; interaction block 516; wrapper module/layer block 518; second wrapped package or downloadable file portion block 519; third wrapped package or downloadable file portion block 520; storage device block 522; reconstruction module block 523; and reconstructed block 524. Some of these blocks will be discussed in the following paragraphs.

INTERACTION BLOCK 504, INTERACTION BLOCK 512 and INTERACTION BLOCK 516: after the initial trigger of the invention, this layer identifies and presents the devices known and used to build the trajectory or forwarding path and presents to the user for confirmation. It only needs to happen once for the workflow.

WRAPPER MODULE/LAYER BLOCK 506, WRAPPER MODULE/LAYER BLOCK 510 and WRAPPER MODULE/LAYER BLOCK 518: this is the wrapper layer, whereby the computer system of diagram 500 pre-emptively seals off the portion of the downloadable so that it can then be transferred or forwarded to the next device in the trajectory.

FIRST, SECOND and THIRD WRAPPED PACKAGES 508, 519,520: The sealed-off or wrappered packages which will be reconstructed once at the final destination storage device block 522. Reconstruction module which takes all wrapped packages 508,519,520, and, using the unique identifiers, reconstructs the portions into a completed downloaded package 524.

Some embodiments of the present invention may include one, or more, of the following operations, features, characteristics and/or advantages: (i) breaks up a download and then stitches it back together on the final device; (ii) creates a model for forwarding downloads across multiple devices; (iii) seals off and then restitches the download back together without corruption; (iv) builds a model that would allow for device forwarding of a download; (v) seals off portions and uniquely identifies the sealed portions to be able to stitch the entire download back together on the final device; (vi) creates a model that allows for device forwarding of a downloads; (vii) seals off portions and uniquely identifies sealed portions; (viii) includes the ability to stitch the entire download back together on the final device; (ix) creates a model that allows for device forwarding of downloads; and/or (x) creates a model that allows for device forwarding of downloads.

Some embodiments of the present invention: seal off a portion of the download, add a unique identifier to the download (so that sealed off portions can be matched to each other), and then ultimately stitch all subsequent portions back together for a final downloaded package, without a degrade in quality or file corruption.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Set of thing(s): does not include the null set; set of thing(s) means that there exist at least one of the thing, and possibly more; for example, a set of computer(s) means at least one computer and possibly more.

What is claimed is:

1. A computer-implemented method (CIM) comprising:

initiating, by a user, an application session on a first device;

during the application session on the first device, initiating, by the user, a set of download(s);

during the application session on the first device, creating an application session data set that includes information indicative of package name, location of the first device, size of the set of download(s), identification of the first device and format(s) for each download of the set of download(s);

receiving, from the user, a first request to continue the application session and its set of download(s) on an intermediary device;

responsive to the receipt of the first request, sealing off the application session at the first device;

further responsive to the receipt of the first request, continuing the application session and its set of download(s) on the intermediary device using the application session data set as sealed off at the first device;

receiving, from the user, a second request to continue the application session and its set of download(s) on a final device;

responsive to the receipt of the second request, sealing off the application session at the intermediary device; and further responsive to the receipt of the second request, continuing the application session and its set of download(s) on the final device using the application session data set as sealed off at the intermediary device.

* * * * *